US008160938B2

United States Patent
Allen et al.

(12) United States Patent
(10) Patent No.: US 8,160,938 B2
(45) Date of Patent: Apr. 17, 2012

(54) SYSTEMS AND METHODS FOR AUTOMATIC BID SOLICITATION DURING TRANSACTION PROCESS

(75) Inventors: Timothy E. Allen, Raleigh, NC (US); John R. Mattox, Raleigh, NC (US); Darryl L. Pierce, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 12/129,327

(22) Filed: May 29, 2008

(65) Prior Publication Data
US 2009/0299874 A1 Dec. 3, 2009

(51) Int. Cl.
G06Q 30/00 (2006.01)
(52) U.S. Cl. ...................................... 705/26.7
(58) Field of Classification Search .................. 705/26, 705/27, 26.7
See application file for complete search history.

(56) References Cited

U.S. PATENT DOCUMENTS

| | | | |
|---|---|---|---|
| 6,055,513 A | 4/2000 | Katz et al. | |
| 6,070,149 A | 5/2000 | Tavor et al. | |
| 7,437,313 B1 | 10/2008 | Mussman | |
| 7,558,773 B2 | 7/2009 | Mancisidor et al. | |
| 2001/0044751 A1 | 11/2001 | Pugliese et al. | |
| 2002/0077960 A1 | 6/2002 | Kiely et al. | |
| 2002/0116287 A1* | 8/2002 | Schubert et al. | 705/26 |
| 2003/0004798 A1* | 1/2003 | McAuliffe et al. | 705/14 |
| 2006/0265288 A1 | 11/2006 | Aronson | |
| 2007/0150361 A1* | 6/2007 | Kreiner et al. | 705/26 |
| 2007/0271149 A1* | 11/2007 | Siegel et al. | 705/26 |
| 2008/0005055 A1* | 1/2008 | Horvitz | 706/62 |
| 2009/0055261 A1* | 2/2009 | Yeh et al. | 705/14 |
| 2009/0222231 A1 | 9/2009 | Berger et al. | |
| 2009/0276323 A1 | 11/2009 | Allen | |

FOREIGN PATENT DOCUMENTS

WO 2001040963 A1 6/2001

OTHER PUBLICATIONS

Business Editors, "IntelliQuest Announces General Availability of Innovative Internet-based Customer Management Program with coolsavings.com," Dec. 23, 1998, Business Wire, p. 1.*

* cited by examiner

Primary Examiner — Jeffrey A Smith
Assistant Examiner — Brandy A Zukanovich
(74) Attorney, Agent, or Firm — Lowenstein Sandler PC

(57) ABSTRACT

Embodiments relate to systems and methods for automatic bid solicitation during a transaction process, in which a user's checkout basket is automatically transmitted to a set of vendors for potential bids based on the user's selected items. The user can select products or services for purchase from an original Web site or vendor. Upon receipt of those selections, a transaction server can identify vendors who wish to receive notification of a pending purchase of particular items. The set of selections can be transmitted to participating vendors to determine a bid on the same or related goods or services. A vendor may wish, for example, to bid to offer after-market support or supplies for a printer or other pending hardware purchase. The user can view the additional bid items in a bid dialog, make selections from those options, and incorporate options of their choosing in the finalized transaction.

21 Claims, 4 Drawing Sheets

SYSTEMS AND METHODS FOR AUTOMATIC BID SOLICITATION DURING TRANSACTION PROCESS

FIELD

The present teachings relate to systems and methods for automatic bid solicitation during a transaction process, and more particularly to platforms and techniques for automatically transmitting a set of purchase items to a set of vendors for alternative bid offers during the process of executing a user transaction.

BACKGROUND OF RELATED ART

It is commonplace in electronic commerce platforms to provide a user with an electronic checkout basket or similar transaction record in which a user can insert desired items for purchase in a single list. In that purchase basket, the user's desired items are typically individually listed along with options for payment, delivery, and other transaction details. In the case of conventional checkout systems, the user simply completes the checkout process by verifying selections and account information, and checking a confirmation button to complete transaction processing.

In some electronic commerce markets, however, the user's set of selected items might be available from more than one vendor, or might have other potential upgrade or support options available from other vendors. In those cases, the user may complete their transaction without being fully aware of the set of transaction choices that could be available to them from alternate sources. It may be desirable to provide methods and systems to automatically transmit a user's set of selections to a pool of registered vendors, who can respond with additional value-added bids or offers for the user to select and incorporate in their purchase.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for automatic bid solicitation during a transaction process. More particularly, embodiments relate to platforms and techniques for capturing a set of selections from a user's checkout basket during a transaction process. The set of selections are then transmitted to a set of registered vendors who form a pool of bidders for potential alternative or additional products to be added to the user's selected items. The set of selections can be transmitted to a transaction server which can identify the individual selections in the user's checkout basket.

The transaction server can associate individual selections from the checkout basket with vendors in the set of registered vendors who wish to participate in a bid process for those selected items. The participating vendors can generate a set of bid options for additional or alternative selections to each original selection populating the user's checkout basket. For example, a vendor may generate a bid to the user to provide after-market technical support for a server purchase. After reviewing the set of bid options produced by the set of registered vendors, the user can select one or more additional or alternative items to add to or update their checkout basket. The user can then finalize and complete their transaction, for instance by executing electronic payment for the finalized set of products and/or services, arranging for delivery of the purchased items, and receiving a transaction record. These and other embodiments described herein address the various noted shortcomings in known electronic commerce technology, and provide a user with an enhanced set of dynamically generated purchase opportunities on a bid basis. In embodiments, the set of bid items for potential purchase can be generated by the set of vendors on a real-time or near real-time bid basis.

Reference will now be made in detail to exemplary embodiments of the present teachings, which are illustrated in the accompanying drawings. Where possible the same reference numbers will be used throughout the drawings to refer to the same or like parts.

Figure 1:
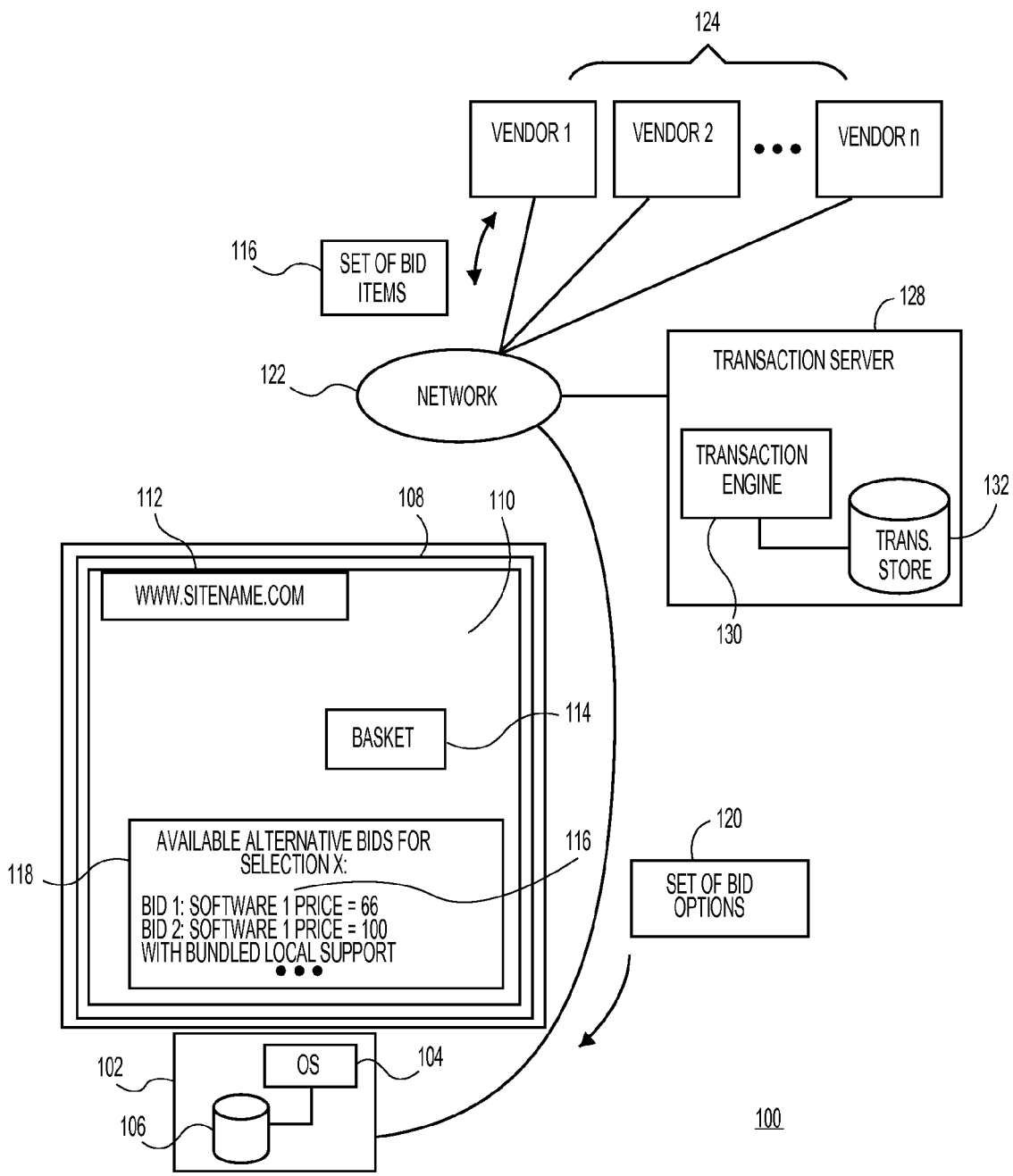
FIG. 1 illustrates an overall system for automatic bid solicitation during transaction process, according to various embodiments.

FIG. 1 illustrates an overall system 100 for automatic bid solicitation during a transaction process, consistent with embodiments of the present teachings. In embodiments as shown, a user can operate a client 102 to use a browser 110 to navigate or browse to a site 112 via a network 122. Client 102 can be a computer, data-enabled cellular telephone, a network-enabled personal digital assistant (PDA), or other device. Browser 110 can be a Web browser, such as the Firefox™, Opera™, or other open-source or proprietary browser application. Site 112 can be identified by a uniform resource locator (URL), which can be in a http://www.sitename.com format under the hyper text transfer protocol. In embodiments, other types or formats of site addressing or identification can be used. Client 102 can host and run under control of an operating system 104, such as a distribution of the Linux™ operating system, the Unix™ operating system, or other open-source or proprietary operating system. Client 102 can present a user interface 108, such as a graphical user interface, to the user via operating system 104. Client 102 can contain or access resources including a local client data store 106, such as a local database stored on a hard drive.

In general, the user operates client 102 to initiate and use browser 108 to browse or navigate to one or more site 112 via network 122. Network 122 can be or include the Internet, or other public or private networks. Site 112 can be hosted by a transaction server 128, such as a Web server configured to execute online transactions, such as the purchase of hardware, software, and/or subscription to services. A user can view the products and/or services available from site 112, and select one or more of those items to include in their transaction. The set of items that the user has selected for their purchase or other transaction can be represented by a set of selections 116 stored in a basket 114. In embodiments, other types of transaction records and/or checkout mechanisms can be used.

According to embodiments as shown, when a user has completed their selections and basket 114 is generated, client 102 can transmit the basket 114 and/or set of selections 116 to transaction server 128 via network 122. Transaction server 128 can comprise hardware, software, logic and other resources to manage and execute electronic transactions across network 122, including transaction engine 130 and transaction store 132. In general, transaction engine 130 can receive the user's set of selections 116 and identify individual products and/or services that the user is attempting to purchase in the transaction. The transaction engine 130 compares that set of products and/or services to records stored in transaction store 132 to identify those vendors in set of vendors 124 who have registered to receive notification of transactions involving those specific items. Transaction engine 130 then generates a set of bid items 126 representing items for which one or more vendors have registered to review pending transaction terms and provide an alternative or additional bid. Transaction engine 130 transmits the set of bid items 126 or portions of that set to corresponding vendors requesting the right to generate bids on particular products and/or services.

After receipt of the set of bid items 126, the participating vendors in set of vendors 124 generate a set of bid options 120 containing alternative or additional bids for products associated with the pending transaction. The set of bid options 120 can comprise, for instance, an offer or bid to sell a piece of hardware, software, and/or services to the user at a different price, or at a different location than the terms reflected in the user's original basket 114. The set of bid options 120 can likewise comprise, for instance, an offer to upgrade or augment the pending purchase of products and/or services, such as for example to provide a technical support subscription for a given period of time. Other types and combinations of bids or offers can be generated. According to various embodiments, responding vendors can each generate a set of bid options 120 by automated response.

A vendor can, for example, configure a server to detect the purchase of a server, storage array, or other hardware by a user within 100 miles of their location, and respond to a pending purchase of that type of product by generating an offer for technical installation or support for a year or other period. A vendor can, for further example, configure a bid to include an automatically discounted price for a larger quantity of the products or services being purchased. Other types of bid logic can be used. According to embodiments, a vendor can incorporate input from an account manager or other agent in generating the desired set of bid options 120. In embodiments, transaction server 128 can receive different responses including a set of bid options 120 from each responding vendor, and aggregate the offered bid components into one combined set of bid options 120.

Transaction server 128 then transmits the set of bid options 120 to the requesting client 102 via network 122. The requesting client 102 receives the set of bid options 120 and presents those purchase options to the user via a bid selector dialog 118. Bid selector dialog 118 can comprise a selection box that enumerates a list of offers received form set of vendors 124 to incorporate in the user's transaction. In embodiments, the user can select one or more options from bid selector dialog 118. The selected options are then transmitted to transaction server 128 to generate an updated basket 114 or other transaction record. In embodiments, the process of circulating the user's set of selections to the set of vendors 124 can be repeated with the user's updated selections, with vendors having an option to repeat the bidding process on the revised set of products and/or services that the user has selected for purchase. In such embodiments, the user can then receive an updated set of bid options 120 based on their updated set of selections 116 reflected in basket 114. When the user is satisfied with their selections including any offers in the set of bid options 120 that they choose to add, the transaction can be finalized and executed via transaction server 128. In embodiments, for example, the selected items from the set of bid options 120 can be added to basket 114 and transmitted to transaction server 128 for completion of the transaction.

Figure 2:
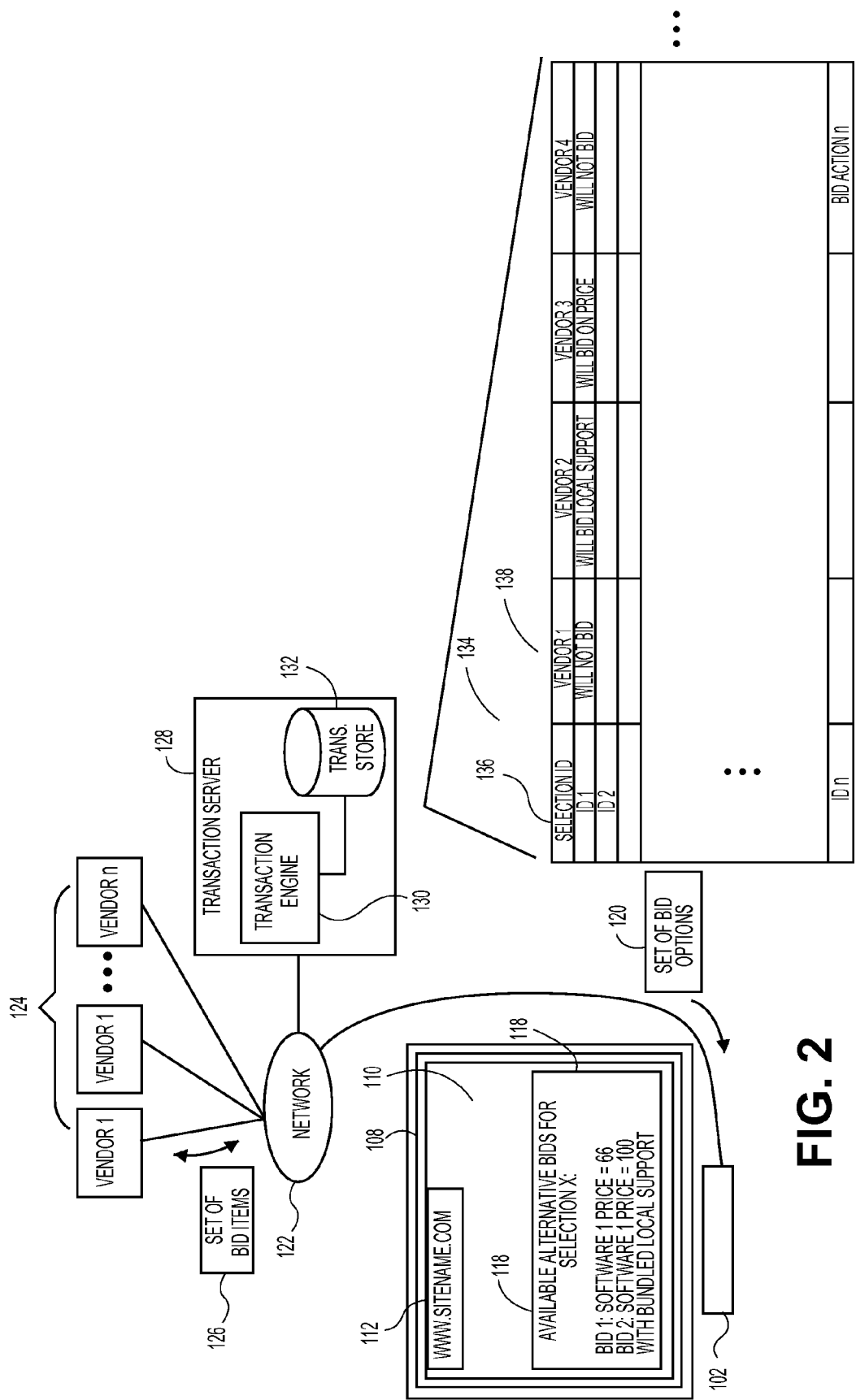
FIG. 2 illustrates an overall system for automatic bid solicitation during a transaction process including a bid table lookup, according to various embodiments.

In embodiments as shown in FIG. 2, transaction engine 130 can more particularly build and maintain a bid table 134, including a selection ID field 136 encoding an identification code for individual products and/or services that may be purchased from site 112, set of vendors 124, or other sources. The bid table 134 can further include a set of registered vendors 138. In embodiments, the set of registered vendors 138 can comprise all vendors in set of vendors 124, arranged in rows according to selection IDs. Fields in the rows can include a code or indication whether individual vendors wish to take a bid action when the particular product or service associated with that row appears in the user's basket 114.

When the user's set of selections 116 contain a product or service ID matching an entry in the selection ID field 136, transaction engine 130 can identify the vendors in the set of registered vendors 138 that wish to receive notification and/or generate a bid action based on the pending purchase of that item. Transaction engine 130 can then generate a set of bid items 126 encapsulating the identified products and/or services, and transmit those items to the set of vendors 124 via network 122. The vendors wishing to produce a bid or offer for additional or alternative products and/or services can respond to transaction server 128 with their offers. In embodiments, transaction server 128 can maintain an open window of time for response to set of bid items, for instance, a period of 15 seconds, 30 seconds, or another period of time to ensure a continuous or near real-time transaction experience for the user. In embodiments, the user can be presented with a bid management dialog to input a desired amount of time to allow for the bidding process. In further embodiments, a user can be presented with an option to turn bid processing on or off during a transaction or by default.

After all bids are collected, transaction engine 130 of transaction server 128 aggregates all generated bids and combine those offers in set of bid options 120, and transmit the set of bid options 120 to the requesting client 102. Client 102 can generate a bid selector dialog 118 and receive any selections by the user based on the set of bid options 120. Client 102 can incorporate selections in an updated basket 114 or other transaction record, and transmit the user's updated set of selections 116 to transaction server 128. In embodiments, the user can be presented with further iterations of bid options 120, if desired. After the user has finalized their set of selections 116, transaction server 128 can complete the user's transaction including all selected items.

Figure 3:
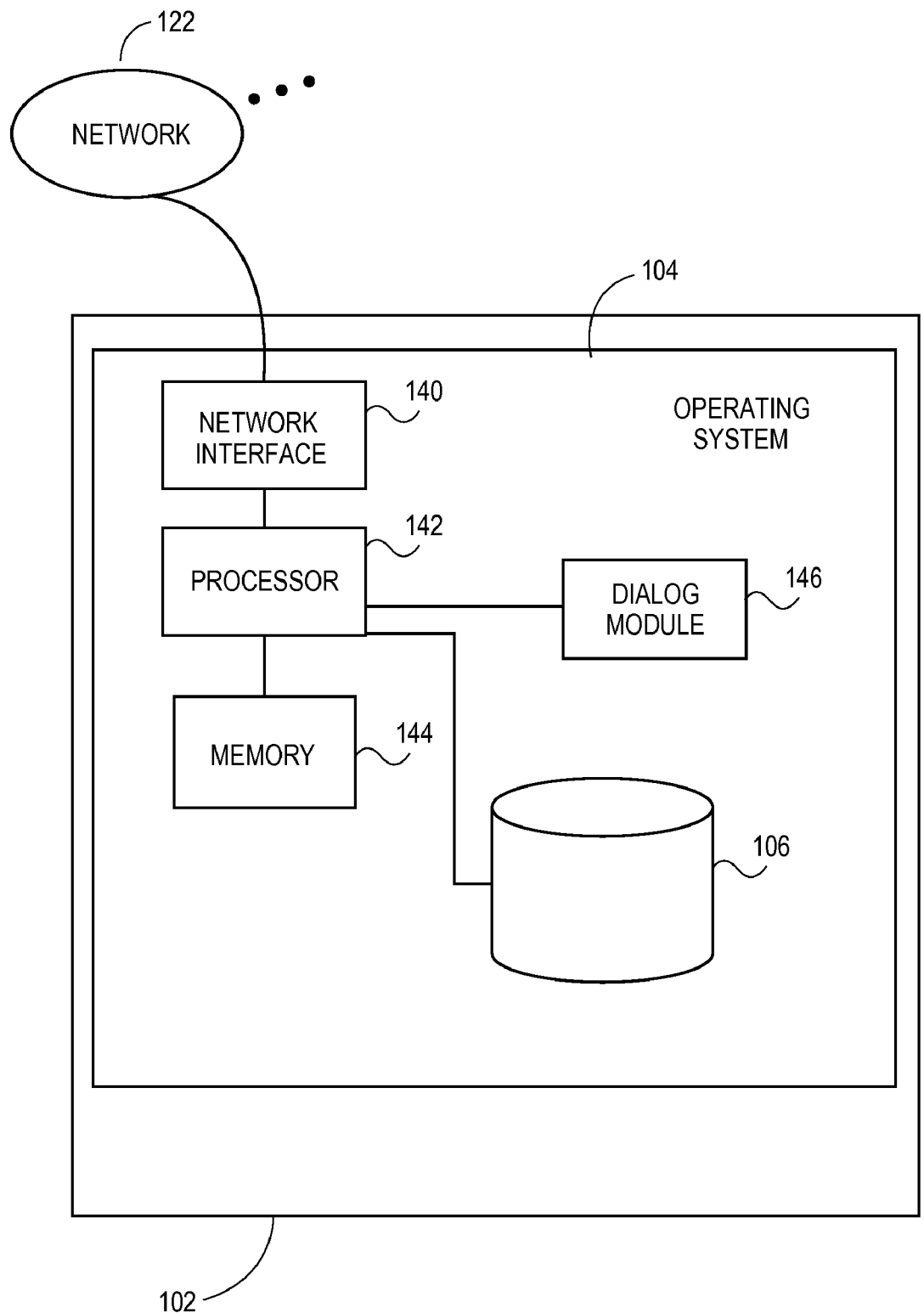
FIG. 3 illustrates an exemplary hardware configuration for a client, consistent with various embodiments.

FIG. 3 illustrates an illustrative configuration of hardware and other resources that can be incorporated in an individual client 102 with which site 112, transaction server 128, and/or set of vendors 124 can communicate via network 122, according to embodiments. In embodiments as shown, client 102 can comprise a processor 142 communicating with memory 144, such as electronic random access memory, operating under control of or in conjunction with operating system 104. Processor 142 also communicates with local client store 106, such as a database stored on a local hard drive. Processor 142 further communicates with network interface 140, such as an Ethernet or wireless data connection, which in turn communicates with network 122, such as the Internet or other public or private networks. Processor 142 can also communicate with a dialog module 146 to generate and receive responses from user dialogs and other interfaces. Other configurations of client 102, associated network connections, and other hardware and software resources are possible.

Figure 4:
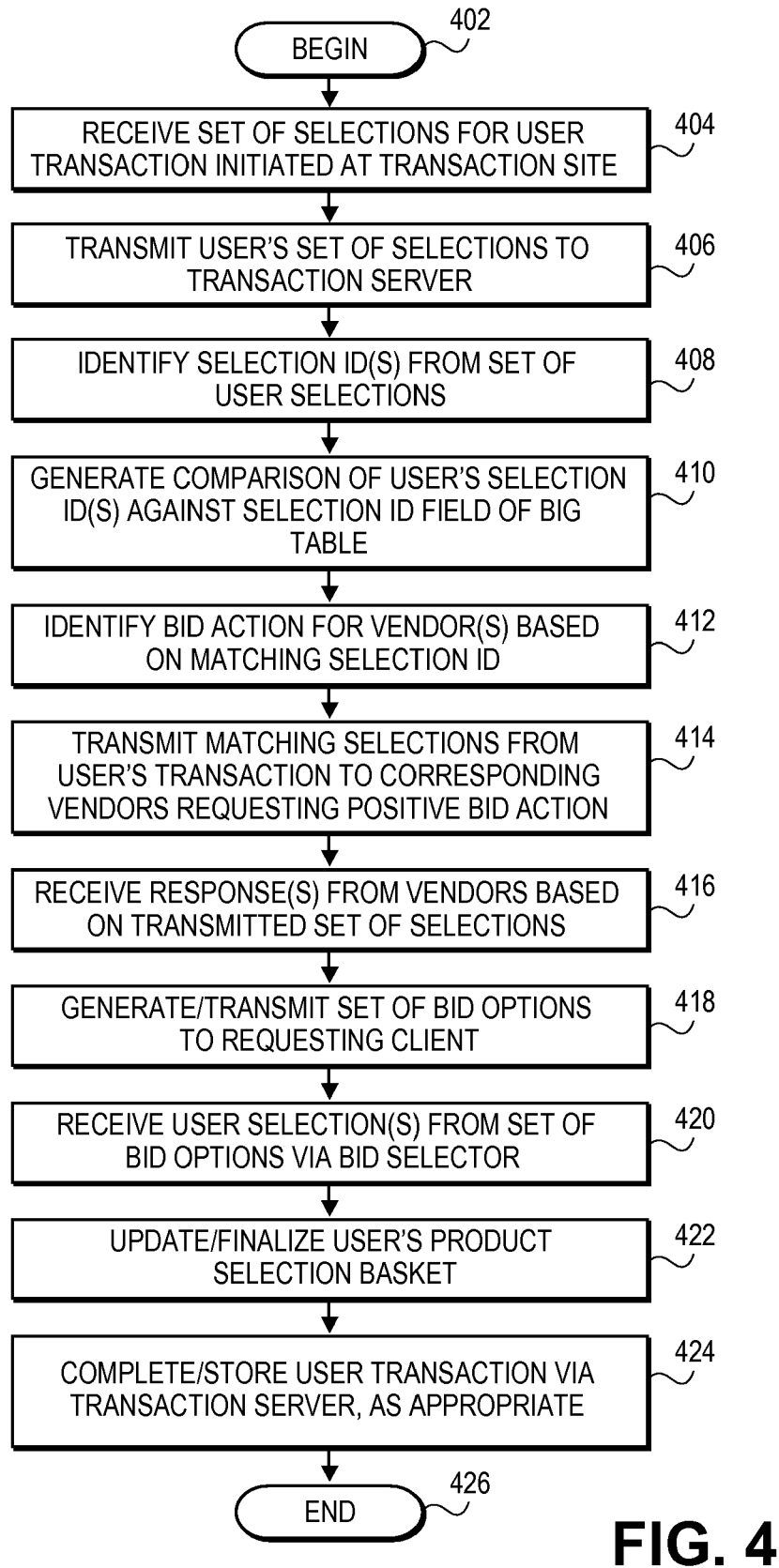
FIG. 4 illustrates a flow diagram of overall transaction processing for automatic bid solicitation during a transaction process, according to various embodiments.

FIG. 4 illustrates a flow diagram of overall transaction processing for automatic bid solicitation during a transaction process, according to embodiments of the present teachings. In step 402, processing can begin. In step 404, a set of selections 116 can be received from a user operating a client 102 to access a site 112 where a transaction is initiated. The set of selections 116 can be or include, for example, software products or subscriptions, hardware products, and/or services such as technical support or warranty plans. The set of selections 116 can be, for instance, be enumerated and stored in a basket 114 generated at the time of the user's initiation of the transaction. In step 406, the set of selections 116 can be transmitted to a transaction server 128 via network 122, such as the Internet. In step 408, the transaction server 128 can identify one or more selection IDs or codes in set of selections 116 identifying particular products and/or services selected by the user to be included in the purchase or other transaction.

In step 410, the transaction engine 130 of transaction server 128 can generate a comparison of the one or more selection ID(s) or codes extracted from the set of selections 116 against a selection ID field 136 of bid table 134. In step 412, the transaction engine 130 can identify one or more vendors in set of registered vendors 138 having a selection ID field 136 matching the ID of the selected product(s) and/or service(s) included in the pending transaction. Transaction engine 130 can identify the recorded bid action(s) for vendors having a matching selection ID field 136, such as, for example, to request details of the set of selections 116 be transmitted to the respective vendor to generate an alternative bid option for the same or related goods and/or services. Vendors may register, for example, to provide a bid offer to the user to the same identified good or service with a different competitive pride, with a different location, or different service or support entitlements. Other types of bid actions are possible.

In step 414, the matching selections can be transmitted to corresponding vendors in set of vendors 124 who have requested the opportunity to execute one or more bid action on the pending transaction. In step 416, the response(s) from participating vendors based on the transmitted set of selections 116 can be received in transaction server 128. In step 418, transaction engine 130 of transaction server 128 can transmit a set of bid options 120 to the requesting client 102 for the user to review. In step 420, user selections from the set of bid options 120 can be received via a bid selector dialog 118. In step 422, the user's basket 114 representing the set of selected products and/or services can be updated and finalized to include any alternative or additional selected items from the set of bid options 120. In step 424, the user's finalized transaction can be completed and a record of that transaction stored via transaction server 128, as appropriate. In step 426, as understood by persons skilled in the art processing can repeat, return to a prior processing point, jump to a further processing point, or end.

The foregoing description is illustrative, and variations in configuration and implementation may occur to persons skilled in the art. For example, while embodiments have been described in which a single transaction server 128 generally executes an online transaction including the automatic collection of bid options from participating vendors, in embodiments transaction logic can be hosted in multiple servers or other resources. Similarly, while embodiments have been described in which a single bid table 134 records selections, vendors, and related transaction information, in embodiments multiple tables or data stores can record transaction information. Other resources described as singular or integrated can in embodiments be plural or distributed, and resources described as multiple or distributed can in embodiments be combined. The scope of the invention is accordingly intended to be limited only by the following claims.

What is claimed is:

1. A method of automatically generating a bid solicitation during a purchase, comprising:
   receiving, via a transaction server, a selection of at least one product or service from a user for purchase from a vendor at defined purchase terms, wherein the selection is offered for purchase through an electronic commerce website;
   determining a plurality of vendors that have registered with the electronic commerce website to provide a bid action on the selection;
   transmitting a notification of the selection to the plurality of registered vendors;
   receiving before completion of the purchase a set of bid options from the plurality of registered vendors, wherein the set of bid options comprises a plurality of alternative terms to complete the purchase from at least one of the plurality of registered vendors; and
   presenting the set of bid options and the selection to the user before completing the purchase.

2. The method of claim 1, wherein the purchase comprises a Web purchase.

3. The method of claim 2, wherein the selection for the Web purchase is stored in a checkout basket.

4. The method of claim 1, wherein the selection further comprises a set of selection IDs.

5. The method of claim 1, wherein the alternative terms comprise at least one of a different price, a different quantity, a different term, or a different set of associated services from the user's originally selected purchase.

6. The method of claim 1, wherein the set of bid options comprises options to purchase at least one additional product or service in addition to the at least one product or service identified in the selection.

7. The method of claim 1, further comprising receiving a user's selections from the set of bid options and the selection and finalizing the purchase based on the selection and the selections from the set of bid options.

8. The method of claim 1, wherein the bid action comprises an indication of a registered vendor's willingness to offer the selection at a different price, offer the selection at a different location, or provide a different service in connection with the selection.

9. A system for generating a bid solicitation during a purchase process, comprising:
   a network interface to a client; and
   a processor configured to execute a purchase engine, the purchase engine being configured to communicate with the client via the network interface and to:
      receive a selection of at least one product or service from a user operating the client to conduct a purchase from a vendor at defined purchase terms, wherein the selection is offered for purchase through an electronic commerce website,
      identify a plurality of vendors that have registered with the electronic commerce website to provide a bid action on the selection,
      transmit notification of the selection to the plurality of registered vendors,
      receive before completion of the purchase a set of bid options from the plurality of registered vendors based on the selection, wherein the set of bid options comprises a plurality of alternative terms to complete the purchase from at least one of the plurality of registered vendors, and present the set of bid options and the selection to the user before completing the purchase.

10. The system of claim 9, wherein the purchase comprises a Web purchase.

11. The system of claim 10, wherein the selection for the Web purchase is stored in a checkout basket.

12. The system of claim 9, wherein the selection comprises a set of selection IDs.

13. The system of claim 9, wherein the alternative terms comprise at least one of a different price, a different quantity, a different term, or a different set of associated services from the user's originally selected purchase.

14. The system of claim 9, wherein the set of bid options comprises options to purchase at least one additional product or service in addition to the at least one product or service identified in the user's originally selected purchase.

15. The system of claim 9, wherein the purchase engine is further configured to receive a user's selections from the set of bid options and the selection and finalize the purchase based on the selection and the selections from the set of bid options.

16. The system of claim 9, wherein the bid action comprises an indication of a registered vendor's willingness to offer the selection at a different price, offer the selection at a different location, or provide a different service in connection with the selection.

17. A set of bid options for a purchase, the set of bid options being stored in a non-transitory computer readable storage media and generated by a method comprising:

receiving, via a tranaction server, a selection of at least one product or service from a user operating a client to conduct a purchase from a vendor at defined purchase terms, wherein the selection is offered for purchase through an electronic commerce website;

identifying a plurality of vendors that have registered with the electronic commerce website to provide a bid action on the selection;

transmitting notification of the selection to the plurality of registered vendors;

aggregating before completion of the purchase a set of bid options from the plurality of registered vendors based on the selection, wherein the set of bid options comprises a plurality of alternative terms to complete the purchase from at least one of the plurality of registered vendors;

transmitting the set of bid options to the client; and presenting the set of bid options and the selection to the user before completing the purchase.

18. The set of bid options of claim 17, wherein the purchase comprises a Web purchase.

19. The set of bid options of claim 18, wherein the selection for the Web purchase is stored in a checkout basket.

20. The set of bid options of claim 17, wherein the alternative terms comprise at least one of a different price, a different quantity, a different term, or a different set of associated services from the user's originally selected purchase.

21. The set of bid options of claim 17, wherein the set of bid options comprises options to purchase at least one additional product or service in addition to the at least one product or service identified in the selection.

* * * * *